United States Patent [19]

Ballard et al.

[11] Patent Number: 5,079,206
[45] Date of Patent: Jan. 7, 1992

[54] CATALYSTS

[75] Inventors: Denis G. H. Ballard, Chester; Anthony Pickering, Kingsley; Peter J. I. Runciman, Upton; Rowena J. Sellens, Boughton; Nicholas J. Walton, Frodsham, all of United Kingdom

[73] Assignee: Imperial Chemical Industries plc, London, England

[21] Appl. No.: 542,938

[22] Filed: Jun. 25, 1990

[30] Foreign Application Priority Data

Jun. 24, 1989 [GB] United Kingdom ............... 8914574

[51] Int. Cl.$^5$ ............................................. C08F 4/16
[52] U.S. Cl. ..................................... 502/153; 502/152; 502/155; 502/158; 502/159; 502/162; 502/164; 502/167; 502/169; 502/170; 526/190; 526/194; 526/329.7; 556/19; 556/30; 556/70; 556/87; 556/404; 556/411
[58] Field of Search ............... 502/152, 155, 158, 159, 502/162, 164, 167, 169, 170, 153; 556/19, 30, 70, 87, 404, 411

[56] References Cited

U.S. PATENT DOCUMENTS

| | | | |
|---|---|---|---|
| 3,927,052 | 12/1975 | Vizurraga | 502/158 X |
| 3,992,432 | 11/1976 | Napier et al. | 502/164 X |
| 4,677,137 | 6/1987 | Bany et al. | 502/152 X |

*Primary Examiner*—Patrick P. Garvin
*Attorney, Agent, or Firm*—Cushman, Darby & Cushman

[57] ABSTRACT

A catalyst for addition polymerization comprising:
(a) an (initiator) first component of Formula (I):

$$MX(Y_n)Z_p \qquad (I)$$

wherein
M is Si, Ge or Sn;
n is 0 or an integer, and p is an integer such that (n+p)=3;
X is a radical

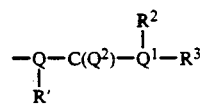

where
Q and $Q^1$ are each independently N, P or As;
$Q^2$ is O, S, NR or PR where R is $C_{1-4}$ alkyl;
$R^1$ is H or optionally substituted hydrocarbyl; and
$R^2$ and $R^3$ are each independently optionally substituted hydrocarbyl, or $R^2$ and $R^3$ together are optionally substituted aliphatic hydrocarbadiyl;
all such $R^1$, $R^2$ and $R^3$ being inert in the process conditions of the present invention;
Y is A or OA where A is optionally substituted hydrocarbyl inert in the process conditions of the present invention, or trialkylsilylalkyl; and
Z is independently any group as definedd for Y, or an organic polymer radical comprising further $MXY_n$ moieties; or
p is 2 and
$Z_2$ is a group $Z^1{}_2$ of the formula —OSiR$^5$R$^8$O— where $R^5$, $R^6$, $R^7$ and $R^8$ are each independently selected from any of the values defined for $R^1$ or $R^2$, or
$Z_2$ is a group $Z^2{}_2$ which is a moiety —ELE— where E is a bond or O and L is a polymer diradical, or E is O and L is an inorganic solid on whose surface the two —O— groups are located, which comprises —OMX(Y)O— moieties; and
(b) a co-catalyst second component.

8 Claims, No Drawings

CATALYSTS

This invention relates to polymerisation catalysts, in particular to catalysts for addition polymerisation, in particular of vinylic monomers, to initiator components for such catalysts, to compositions comprising such components, and to a polymerisation process, in particular the addition polymerisation of vinylic monomers, using the catalysts. (The term 'polymerisation' herein includes all types of polymerisation, including homo- and co-polymerisation, and the term 'monomer'herein includes a reference to oligomers).

It is desirable to be able to produce high molecular weight polymers in catalysed addition polymerisation, in particular of vinylic (including acrylic) monomers, with a narrow molecular weight distribution.

It is also desirable to be able to achieve the bulk polymerisation of such monomers.

However, hitherto this has been difficult to achieve, especially in the case of acrylics, owing to the tendency of known catalysed systems to suffer from an excessive and uncontrollable reaction exotherm, and most polymerisations of this type have therefore disadvantageously had to be carried out in solution.

We have found that the catalysts of this invention may be used advantageously to produce high molecular weight polymers with a narrow molecular weight distribution, and especially in some cases for controlled bulk polymerisation of vinylics, in particular of acrylics.

Accordingly, the present invention in a first aspect provides a catalyst for addition polymerisation comprising (a) an (initiator) first component of formula (I):

$$MX(Y_n)Z_p \quad (I)$$

wherein

M is Si, Ge or Sn;
n is 0 or an integer, and p is an integer such that $(n+p)=3$;
X is a radical

where
Q and $Q^1$ are each independently N, P or As;
$Q^2$ is O, S, NR or PR where R is $C_{1-4}$ alkyl;
$R^1$ is H or optionally substituted hydrocarbyl; and
$R^2$ and $R^3$ are each independently optionally substituted hydrocarbyl, or $R^2$ and $R^3$ together are optionally substituted aliphatic hydrocarbadiyl;
all such $R^1$, $R^2$ and $R^3$ being inert in the conditions of the process of the present invention;
Y is A or OA where A is optionally substituted hydrocarbyl inert in the conditions of the process of the present invention, or trialkylsilylalkyl; and
Z is independently any group as defined for Y, or an organic polymer radical comprising further $MXY_n$ moieties; or
p is 2 and $Z_2$ is a group $Z^1_2$ of the formula $OSiR^5$-$R^6OSiR^7R^8O$-where $R^5$, $R^6$, $R^7$ and $R^8$ are each independently selected from any of the values defined for $R^1$ or $R^2$, or $Z_2$ is a group $Z^2_2$ which is a moiety —ELE— where E is a bond or O and L is a polymer diradical, or E is O and L is an inorganic solid on whose surface the two —O— groups are located, L in both cases comprising further —$OMX_mY_nO$—moieties; and (b) a (co-catalyst) second component salt comprising an anion selected from azide, cyanide, cyanate, fluoride, bifluoride, nitrate and optionally substituted organic mono- and poly-phosphonates, -phosphinates -sulphonates, -sulphinates, -carboxylates, -siloxides and -oxides: and
a cation which in use of the catalyst is inert under the polymerisation process conditions yet renders the co-catalyst available in the polymerising medium.

The anions from which the anion of component b) is selected include aliphatic and aromatic anions of the above organic types, optionally substituted by electron withdrawers, such as cyano, halo including fluoro and chloro, and nitro in aromatic moieties.

The cation may render the catalyst available inter alia by rendering it soluble to an extent which renders the use of the catalyst practicable.

In the (initiator) first component a) of the catalyst:
Favoured M is Si.

The term 'optionally substituted' herein in relation to X, Y and Z groups includes substitution by pendent mono-or di-valent groups, and, in relation to X only, includes substitution by hetero-atoms, including in particular, in the case of X, O, so that e.g. $R^1$ may be a hydrocarbyloxy group, or Si, so that X may in effect comprise another $M(Y_n)Z$ group.

Bonds between M and at least one of X, Y or Z break in the catalytic process of the present invention.

It will be appreciated, however, that the groups themselves should be inert in the process conditions.

Unsubstituted hydrocarbyl and hydrocarbadiyl, including all such $R^1$, and $R^2$ and $R^3$ groups, and the latter substituted by hetero-atoms will all be inert in the conditions of the process of the present invention.

Such groups which are substituted and also inert in the conditions of the process of the present invention include the above groups substituted by electron donors such as amino substituted by aliphatic substituents, such as alkyl, cycloalkyl and alkoxy.

Such groups, even when described as optionally substituted, are often unsubstituted by pendent monovalent substituents.

Within X as hereinbefore defined each of Q and $Q^1$ independently is often N or P; preferably both are N or P, and in particular both are N.

$Q^2$ is often O, so that X often comprises a ureido function.

Suitable $R^1$, $R^2$ and $R^3$ optionally substituted hydrocarbyl include optionally substituted alkyl and cycloalkyl (including polycycloalkyl).

Suitable $R^1$, $R^2$ and $R^3$ optionally substituted hydrocarbyl also include optionally substituted aryl and aralkyl.

Suitable $R^1$, $R^2$ and $R^3$ optionally substituted alkyl and such alkyl as a component within $R^1$ or $R^2$ include optionally substituted $C_{1-6}$alkyl, unsubstituted by hetero-atoms, and a preferred group of such alkyl groups for each of $R^1$, $R^2$ and $R^3$ independently includes methyl, ethyl, n-propyl, n-butyl, n-pentyl and n-hexyl (especially for $R^1$), and methyl especially for each of $R^2$ and $R^3$ independently.

In a second preferred group, when Q and/or $Q^1$ is N or P, in particular when both are N, such $R^1$ include oxa-substituted alkyl, e.g. $C_{1-6}$ alkoxy, especially methoxy.

In a third preferred group, when Q and/or $Q^1$ is N or P, in particular when both are N, such $R^2$ include silasubstituted alkyl, e.g. trialkylsilyl, especially trimethylsilyl.

Suitable $R^1$, $R^2$ and $R^3$ optionally substituted cycloalkyl include such $C_{5-8}$ cycloalkyl, for example cyclohexyl, and polycycloalkyl. Such cycloalkyl groups are often unsubstituted.

Suitable $R^1$, $R^2$ and $R^3$ optionally substituted aryl include phenyl optionally substituted by substituents inert in the desired polymerisation conditions, which include alkyl and aryl. Such aryl groups are however often unsubstituted.

Suitable $R^1$, $R^2$ and $R^3$ optionally substituted aralkyl groups include the above suitable alkyl groups substituted by the above suitable aryl groups, and thus include benzyl optionally substituted in the phenyl ring, but more often unsubstituted benzyl.

One $R^2$ or $R^3$ component within corresponding $Q^1R^2R^3$ may be bulkily substituted aralkyl, and/or one $R^1$, $R^2$ or $R^3$ component within corresponding X may be bulky cycloalkyl (especially polycycloalkyl) or optionally substituted branched alkyl.

Corresponding catalysts of the present invention comprising a corresponding initiator component a) may be used advantageously in vinylic bulk polymerisation systems, especially where any such group is bulkily substituted aralkyl, or adamantyl or neopentyl. The same advantages attach to initiator components where a suitable analogue of the foregoing is present in an of the Y, Z or A group listed below.

In particular when $Q^1$ is N, $R^2$ and $R^3$ may be optionally substituted hydrocarbadiyl.

In one group of the components a), $(R^2+R^3)$ are unsubstituted by hetero-atoms.

In a second group, such $(R^2+R^3)$ are substituted by hetero-atoms other than nitrogen.

In a third group, such $(R^2+R^3)$ are unsubstituted by pendent monovalent substituents.

For all values of $Q^1$:

Suitable $(R^2+R^3)$ optionally substituted aliphatic hydrocarbadiyl exclude 1,2-diyl, but include optionally substituted alkanediyl, cycloalkanediyl (including polycycloalkanediyl), and diradical combinations of such diradicals.

Suitable $(R^2+R^3)$ optionally substituted alkanediyl include $\alpha,\omega\text{-}C_{3-6}$ alkanediyl optionally substituted by at least one hetero-atom or -group.

Suitable substituent hetero-atoms and groups include O, S or $NR^3$ where $R^4$ is independently any of the values of $R^1$, or independently another group $M(Y_n)Z_p$ as hereinbefore defined.

Corresponding $QR^1R^2$ groups thus include 4 to 7-member heterocyclyl groups, such as pyrrolidino, piperidino and morpholino, and $N\text{-}C_{1-4}$ alkylpiperazino, and phospha-analogues thereof. Such groups are often not further substituted.

$R^1$ may be alkylene or arylene and either $R^2$ or $R^3$ may be alkylene or arylene in a polyurea chain bearing other $M(Y_n)Z_p$ groups. Suitable corresponding X will consist of a repeat moiety of formula:

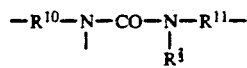

where $R^{10}$ and $R^{11}$ are each independently alkylene or arylene.

Suitable Y and Z groups and A groups within Y and Z include those recited for monovalent $R^1$ hereinbefore.

Suitable Y, Z and A alkyl groups include $C_{1-20}$ alkyl groups, such as $C_{1-8}$ alkyl groups. Suitable $C_{1-8}$ alkyl groups include favoured straight-chain $C_{1-4}$ alkyl groups, preferably methyl and ethyl, in particular methyl. They also include branched $C_{4-8}$ alkyl groups, in particular those with a high degree of branching, e.g. optionally substituted (but often unsubstituted) neopentyl.

Suitable Y and Z alkoxy groups include $C_{1-4}$ alkoxy, e.g. methoxy and ethoxy, e.g. ethoxy.

Suitable Y, Z and A cycloalkyl groups include $C_{4-7}$ cycloalkyl, thus including cyclohexyl, and polycycloalkyl, in particular adamantyl.

Suitable Y and Z optionally substituted cycloalkoxy groups thus include $C_{4-7}$ cycloalkoxy, thus including cyclohexyloxy, any of which may be $\alpha$-oxo or $\alpha,\omega$-dioxo substituted.

Within Y, Z and A aryl and aralkyl groups, optionally substituted aryl groups include optionally substituted phenyl and 1-naphthyl.

Suitable substituents for such aryl groups include substituents inert in the desired polymerisation conditions provided the conjugate protic acid of such aryl groups has a $pK_a$ in DMSO < 18. Such groups will be readily apparent to the skilled man, but include alkyl and aryl groups, and exclude carbonyl-containing ones. Such aryl groups are often unsubstituted.

Suitable Y and Z optionally substituted aryloxy groups thus include optionally substituted phenoxy.

Within Y, Z and A aralkyl groups, favoured alkyl groups include $C_{1-4}$ alkyl, in particular methyl.

Favoured Y and Z aralkyl groups thus include phenyl $C_{1-4}$ alkyl, in particular benzyl. Such groups are optionally substituted in the phenyl ring, but are often unsubstituted. Suitable substituents include those listed above for Y and Z aryl groups.

Favoured Y and Z aralkoxy groups include phenyl-$C_{1-4}$ alkoxy, e.g. benzyloxy, optionally substituted in the phenyl ring. Suitable substituents include those listed above for Y and Z aryl groups.

When p is 2, $Z_2$ groups include $-OSiR^5R^6OSiR^7R^8O-$, where $R^5$ to $R^8$ are the same and are optionally substituted benzyl (e.g. unsubstituted benzyl), $C_{1-6}$ alkyl or optionally substituted phenyl. $R^5$ to $R^8$ are often unsubstituted.

The term 'polymer' herein in relation to the initiator components of the present catalysts and their compositions includes a reference to oligomers. The term in particular includes polymers of vinylic monomers.

Where Z is an organic polymer radical, or $Z_2$ is or comprises a polymer diradical, the polymer is preferably a particulate one insoluble in any desired polymerisation system (for example a highly crosslinked polymer) with the $MX_mY_n$ moieties on its surface.

Preferably the polymer is a solid granulate of relatively high surface area, for example in the range 200 to 600 $m^2/gm$, favourably with a concentration of $MX_mY_nZ$ moieties of 1 per 3 to 30 square Angstrom.

M in each $MX_mY_nZ$ moiety may be linked to the polymer via a carbon atom on e.g. a pendent alkyl containing chain of the type described for Y and Z straight chain alkyl above.

The $M(Y_n)Z_p$ groups on the polymer will often all be identical.

Depending on the polymerisation medium in which the present catalyst is used, in particular where the initiator is to be insoluble, highly cross-linked alkylene, arylene, acrylic or styrene homo- or co-polymers may be appropriate for L polymer diradicals.

Favoured $Z_2$ groups also include —OLO— where L is an inorganic solid with a plurality of surface hydroxyl functions, such as silica or a metal hydroxide or hydrated oxide, e.g. alumina.

L may be inter alia a flat body of low specific surface area or (preferably) particulate with a relatively high specific surface area, for example in the range 200 to 600 $m^2/gm$.

Favourably, the $OMXY_nO$— moieties are present on the surface at a concentration of 1 per 3 to 30 square Angstrom. Such concentrations may be achieved by involving at least 20%, preferably at least 60%, of the available surface hydroxyl functions in —OLO—bonding to $MXY_n$ moieties.

Favoured anions in the co-catalyst second catalyst component include fluoride, bifluoride and aliphatic and aromatic mono-sulphonates, in particular fluoride, bifluoride and methanesulphonate ions.

Favoured cations therein, which render the catalyst available in the polymerisation medium, are often substituted -onium ions. These include quaternary ammonium and phosphonium, and tris(dialkylamino)-sulphonium, often substituted by relatively bulky organic-soluble groups e.g. $C_{3-6}$ alkyl, such as butyl, or $C_{5-8}$ cycloalkyl.

Alkali and alkali earth metal cations are less preferred, but may be used if, in addition to the cations of the second catalyst component, the catalyst also includes a solubilisation aid.

For example, a crown ether may be used to complex the cations in the second catalyst component.

Typically the catalyst may comprise the first and second components in molar ratios in the range of 300:1 to 3:1 more often 100:1 to 8:1.

Where, for example, a crown ether is present this will of course be present in an appropriate molar ratio to the second component, for example in the range of 0.3:1 to 3:1.

In a second aspect the present invention provides an initiator component a) of formula (I) for the catalyst of the first aspect of the invention.

A group of catalyst first (initiator) components consists of those of formula (II)

  (II)

wherein
M is Si, Ge or Sn;
q and r are each an integer such that (q+r)=3;
X and Y are as defined hereinbefore; and
$Z^3$ is a monovalent Z group as hereinbefore defined.

Suitable, favoured and preferred X, Y and $Z^3$ are as so described for relevant X, Y and Z hereinbefore.

Suitable, favoured and preferred groups X in formula (II) include respectively any of the groups composed of those variables Q, $R^1$, $R^2$ and $R^3$ or $(R^2+R^3)$ correspondingly described as suitable, favoured or preferred groups hereinbefore.

When, in a sub-group within formula (II), the or each $Z^3$ substituent is a monovalent polymer radical, this will typically be a polymer as described for L in formula (IV) below.

Particular first components are those within formula (II) which are named in the Examples hereinafter.

Catalysts of the present invention comprising a component a) of this preferred group are of particular interest for use in vinylic bulk polymerisation systems, in particular acrylic systems of this type.

A second group of catalyst first (initiator) components consists of those of formula (III):

$$MX(Y)Z^1{}_2 \quad (III)$$

wherein
M, X, and Y are as defined in formula (II);and
$Z^1{}_2$ is a group of the formula —$OSiR^5R^6OSiR^7R^8O$— as defined in formula (I).

Suitable, favoured and preferred variables in formula (III) are as so described for corresponding variables hereinbefore.

In a third group of first catalyst components consists of those of formula (IV):

  (IV)

wherein
M, X and Y are as defined in formula (II); and
$Z^2{}_2$ is a moiety —ELE— where E is a bond or O and L is a polymer diradical, or E is O and L is an inorganic solid on whose surface the two —O— groups are located, which comprises further —OMX(Y)O— moieties.

Suitable, favoured and preferred X and Y are as so described in formula (II).

L is favourably an organic polymer diradical.

'Polymer' as hereinbefore defined includes oligomer, but, depending on the polymerisation medium in which the initiator component is to be used, L may appropriately be a highly crosslinked alkylene, arylene, acrylic or styrene homo- or co-polymer.

L is preferably a solid granulate of such a polymer with other moieties of formula M(X)Y on its surface at a concentration of 1 per 3 to 30 $A^2$, and with a specific surface area in the range 200 to 600 $m^2/gm$, as hereinbefore described.

L may also be an inorganic solid, such as silica or alumina, with the same favoured of other M(X)Y groups on its surface. In the case of silica or alumina, this concentration may be achieved by involving at least 20%, and preferably at least 65% of the available surface hydroxyl functions in —OLO— bonding.

Initiator components of formulae (II) and (III) and some of formula (IV) where L is an organic oligomer will tend to be soluble or dispersible in desired polymerisation systems. All the initiator components may be used as such, or they may be formulated into compositions with other materials (in particular in the foregoing case where it is desired to avoid solution or dispersions of the initiator.

In the latter case, they may be formulated into insoluble or non-dispersible compositions, e.g. with such conventional materials as catalyst supports. Such compositions are of use in the catalysis of addition polymerisation, e.g. of vinylic monomers, and also (desirably) in order to be able to achieve the bulk polymerisation of such monomers.

Compositions comprising a present component a) form a third aspect of the present invention.

Compositions comprising a component a) of formula (II) form a favoured group of such compositions, although others of this invention may be used analogously with similar results.

Favoured and preferred compositions of this third aspect of the present invention include those which comprise a component a) itself described as favoured or preferred or hereinbefore.

Where such a composition is insoluble it may be seen as an alternative to insoluble forms of the initiator component itself, i.e. when $Z^3$ is an insoluble polymer radical or diradical or $Z^2$ is a moiety —OLO—, all as hereinbefore defined. The initiator component in such a composition is often adhered to or embedded in the surface of a support (rather than chemically bonded to it as hereinbefore.

The support may comprise a polymer, e.g. a highly cross-linked acrylic or styrene homo- or co-polymer, preferably a particulate one insoluble in any desired polymerisation system, or a similarly insoluble (particulate) inorganic solid.

Any co-catalyst component b) which in use of the catalyst is available in the polymerisation as described hereinbefore is suitable for use with the present compositions.

In a fourth aspect the present invention provides an addition polymerisation process catalysed by a catalyst of the first aspect of the invention. The process may be the polymerisation of vinylic monomers (including oligomers), in particular bulk homo- or co-polymerisation, especially of acrylic monomers or oligomers.

The catalysts and compositions of the present invention are used in conventional manner therein.

The process may be carried out using a number of different embodiments of the catalysts of the first aspect of the invention.

Thus, for example, in a first embodiment both the initiator component a) and the co-catalyst component b) may be soluble in a monomer to be polymerised and/or in a reaction vehicle.

In a second embodiment the initiator a) may be in an insoluble form, such as one of those initiators which comprises an insoluble organic polymer or inorganic moiety, e.g. where in formula (I), p is 2 and $Z^2{}_2$ is a group —ELE— as hereinbefore defined; or the initiator may be comprised in an insoluble composition such as a conventional insoluble catalyst support. All such insoluble forms are described hereinbefore.

Under the polymerisation process conditions the co-catalyst b) must be available to effect polymerisation in the polymerisation medium.

This often means that it must be soluble in at least one liquid monomer species, in a solvent compatible with the monomer(s) and inert in the present process conditions and/or in phase which contains at least one monomer species, to such an extent that it can catalyse the reaction adequately. Thus in bulk polymerisations, if the co-catalyst is not soluble in a monomer, an inert solvent compatible with the monomer(s) may be used, but just in sufficient quantities to dissolve the co-catalyst.

Examples of suitable inert solvents or vehicles (if desired) include ether solvents such as dimethyl ether, diethyl ether, dimethoxyethane, diethoxyethane, diethyleneglycol dimethyl ether or tetrahydrofuran; and hydrocarbon solvents such as benzene, toluene or xylene. The ether series of solvents are preferred amongst such solvents.

In general such liquids should not contain labile hydrogen or halogen atoms or activated groups.

The initiator which forms component a) is generally used in an amount corresponding to a molar ratio of 1:10 and generally less, and preferably 1:1000 to 1:50 relative to the monomer(s) except where the initiator comprises an insoluble polymeric or inorganic solid (i.e. in formula (I) $Z^2{}_2$ is —ELE— where E is a bond or O and L is polymer diradical or E is O and L is an inorganic solid as hereinbefore defined).

In the latter case the initiator is generally used in an amount corresponding to a molar ratio of 1:100 to 1:5 relative to the monomer(s). As noted hereinbefore, the ratio of initiator a) to co-catalyst b) is generally in the molar ratio range of 300:1 to 3:1, more often 100:1 to 8:1, i.e. the co-catalyst is generally used at a molar ratio to monomer of 1:300,000 to 1:400. The ratio of initiator to co-catalyst is given hereinbefore.

Polymerisation reactions of this invention may be conducted, for example, at temperatures ranging from $-100°$ C. to $150°$ C.; a range of $-20°$ to $60°$ C. is preferable, or $-100°$ to $30°$ C. in the case of bulk polymerisation. These processes may be conducted under 0.1 to 50 atmospheres pressure but normally atmospheric pressure is suitable.

It is desirable that processes of this invention should be conducted under anhydrous conditions, and the water content of the, monomers, polymerisation initiators and co-catalysts any solvents minimised in order to obtain high molecular weight polymers by this method.

It is desirable to ensure that processes of this invention are conducted in atmospheres that have been dried in order to prevent the penetration of any water.

Such atmospheres would include dry air, or atmospheres of dried inert gases such as nitrogen or argon; dried inert gas atmospheres are preferable.

No particular restrictions are placed on the order in which the polymerisation initiator, a) or a composition comprising it, co-catalyst b) and monomer are added to the reaction system in processes of this invention and polymerisation will proceed whatever sequence is used.

For example, the catalyst components may be mixed and added to the monomer. However, in terms of being able to control the polymerization reaction easily, especially in the bulk polymerisation of acrylics, it is desirable to add the initiator a) or composition comprising it and co-catalyst b) separately to the monomer, or to add one catalyst component to the monomer or vice versa and add the product mixture to the other catalyst component, or vice versa.

Thus, where the initiator and co-catalyst are both soluble in a solvent in which the monomer is also soluble, it is often desirable to add the initiator and co-catalyst b) separately to the monomer or a solution thereof. Initiator a) or co-catalyst b) added to the reaction mixture should normally be added neat, or in the form of a solution in tetrahydrofuran or the same organic solvent as any used in the polymerisation reaction. Often the initiator is added first to the monomer. Similarly where the initiator a) or its composition is insoluble, it is often desired to add the co-catalyst b) to the monomer and to contact the product mixture with the initiator a) or its composition.

In both cases further monomer (which may be the same as or different from the initial monomer) may be added in the second mixing step.

If block copolymers are to be prepared by a solution process of this invention using two or more monomers, after initially polymerising the first monomer using an initiator and co-catalyst, the second monomer is generally added to the initial product polymer solution in solution in a suitable organic solvent, which is normally the same as the first reaction solvent.

Any vinylic monomer in which the olefinic moiety is not substituted by any functional group possessing acidic hydrogen atoms may be polymerised in the present process.

Typical examples of vinylic monomers without such functional groups include:

methacrylic acid esters such as methyl methacrylate, ethyl methacrylate, propyl methacrylate, butyl methacrylate, 2-ethylhexyl methacrylate, lauryl methacrylate and tricyclo[5,2,1,0$^{2'6}$]dec-3-en-8-yl methacrylate;

polyunsaturated methacrylic acid esters such as glycidyl methacrylate, triethyleneglycol dimethacrylate and allyl methacrylate;

acrylic acid esters such as methyl acrylate, ethyl acrylate, isopropyl acrylate, n-butyl acrylate, sec-butyl acrylate, tert-butyl acrylate and cyclohexyl acrylate;

unsaturated nitriles such as methacrylonitrile and acrylonitrile;

N,N-dialkyl unsaturated amides such as N,N-dimethylacrylamide; and aromatic vinyl compounds such as styrene, o-, m-or p-methylstyrene, o-, m- or p-methoxystyrene α-methylstyrene, o-, m- or p-dimethylaminostyrene or m-or p-chlorostyrene.

Preferred amongst these monomers are methyl methacrylate, lauryl methacrylate, butyl methacrylate, 2-ethylhexyl methacrylate and tricyclo[5,2,1,0$^{2'6}$]-dec-3-en-8-yl methacrylate, acrylonitrile, styrene, methyl acrylate, butyl acrylate, methacrylonitrile, α-methylstyrene and p-chlorostyrene, in particular methyl methacrylate, lauryl methacrylate, 2-ethylhexyl methacrylate, tricyclo[5,2,1,0$^{2'6}$]dec-3-en-8-yl methacrylate, butyl acrylate and acrylonitrile. These monomers may be used singly or in combination.

The co-catalyst components b) are known materials.

The initiator components a) are preparable analogously to, or are routinely derivable, from known materials. For example many of the groups X, Y and Z may be introduced to form the compounds of formula (I) by conventional nucleophilic displacement at the M nucleus with suitable corresponding moieties.

Where the M nucleus is linked by two —O— groups to a solid or polymer diradical as hereinbefore defined, the links may be formed by conventional silylation of adjacent hydroxyl groups.

In all cases, such preparative procedures thus include and are exemplified by the methods in the following Examples.

The preparation of initiators and use of catalysts of the present invention is illustrated by the following Examples:

EXAMPLES 1 AND 2- PREPARATION OF INITIATOR COMPONENTS a) of General Formula MXZ₃

Example 1—Preparation of
1,1-dimethyl-3-trimethylsilyl-3-hexylurea (E.1)

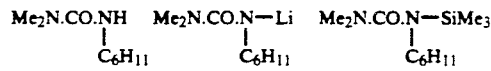

To a solution of 1,1-dimethyl-3-hexylurea (15 g) in dry THF (200 ml) was added butyllithium (56 ml; 1.6M in hexane). Once the butyllithium addition was completed, the solution was heated to reflux for 1.5 hours and then allowed to cool. Chlorotrimethylisilane (12 ml) was added dropwise to the cooled mixture and then heated to reflux for 4 hours. Toluene (150 ml) was added to the cool mixture which was then filtered to remove LiCl.

The filtrate was collected and the solvent removed under vacuum leaving a crude grey compound.

The crude product was further purified by vacuum distillation to give a white compound (E.1) in an 84% yield.

It could be further purified by recrystallisation in hexane.

The following compounds were prepared analogously from the corresponding urea and chlorosilane:

| | |
|---|---|
| 1,1-dimethyl-3-trimethylsilyl-3-methylurea | (E.2) |
| 1,1-dimethyl-3-trimethylsilylurea | (E.3) |
| 1,3-bis(trimethylsilyl)-1,3-dimethylurea | (E.4) |
| 1,1-dimethyl-3-trimethylsilyl-3-(n-propyl)urea | (E.15) |
| 1,1-dimethyl-3-trimethylsilyl-3-methoxyurea | (E.16) |

EXAMPLE 2

The following compounds are prepared analogously from the corresponding urea and chlorosilane:

| | |
|---|---|
| 1,1-dimethyl-3-phenyl-3-trimethylsilylurea | (E.5) |
| 1,1-dimethyl3-benzyl-3-trimethylsilylurea | (E.6) |
| 1-(N-methyl-N-trimethylsilylcarbamoyl)-pyrrolidine | (E.7) |
| 1-(N-methyl-N-trimethylsilylcarbamoyl)-piperidine | (E.8) |
| 1-(N-methyl-N-trimethylsilylcarbamoyl)-4-methylpiperazine | (E.9) |
| 1-(N-methyl-N-trimethylsilylcarbamoyl)-imidazolidine | (E.10) |
| 3-(N-methyl-N-trimethylsilylcarbamoyl)-oxazolidine | (E.11) |

EXAMPLE 3—PREPARATION OF INITIATOR COMPOUNDS OF General Formula MXY (ELE) (E.12)

A suspension of fumed silica (Carbosil-SM) is lithiated analogously to Example 1, and the product is treated with an excess of dichloro-N-(N',N' dimethylcarbamoyl-N-hexylamino) (methyl)silane to give the desired product. Finely divided alumina may also be used.

EXAMPLE 4—PREPARATION OF INITIATOR COMPOUNDS OF a) General Formula MXY₂Z where Z is a Polymer Radical b) General Formula MXZ₃ where X is a Polymer Chain a) Preparation of
poly(N-dimethylcarbamoyl-N-hexylamino-methylsilyldimethylsilylpropyl methacrylate) (E.13))

1.1-dimethyl-3-hexylurea is N-lithiated analogously to Example 1, and the product is treated with chloro-(3-methacryloxy- propyl)dimethylsilane to give the above monomer. The monomer is polymerised conventionally to give the desired product.

b) Preparation of Poly(1-trimethylsilyl-3-(1'-propylbutylene)-3-methylurea) (E.14)

A polyurea, poly(3-(1'-propylbutylene)-1-methylurea) is N-lithiated in THF solution at $-70°$ C., and the product is treated with chlorotrimethylsilane to give the desired product.

EXAMPLE 5—POLYMERISATION USING CATALYSTS COMPRISING above Initiator Components—In situ generation of catalyst by combining initiator and co-catalyst As noted hereinbefore a co-catalyst salt (second component) b) of the type of the present invention is not generally added to the initiator (first) component a) to form the catalyst before use, but the combination is often generated in situ in the polymerisation medium, using components a) and b) in an appropriate mutual molar ratio as hereinbefore described.

The exact order of addition of all the components to the polymerisation medium will depend to some extent on the specific conditions, e.g. bulk or solution polymerisation, and on the polymerising monomers.

The following conditions are typical for the bulk polymerisation of methacrylic and/or acrylic ester and acrylic nitrile monomers.

The following tetrahydrofuran solutions of co-catalysts were prepared:

- (C.1) Tetrabutylammonium fluoride trihydrate, pre-dried under high vacuum and over $P_2O_5$, made up into 0.1M solution.
- (C.2) Anhydrous tetrabutylammonium fluoride (Aldrich), dried over $CaH_2$ overnight, made up into 1M solution.
- (C.3) Tetrabutylammonium methanesulphonate, made up into 0.1M solution.
- (C.4) Tetrabutylammonium fluoride - hexamethylacetylacetone complex, made up into 0.1M solution.

To a solution of (E.1) initiator component a) (0.05 mmole) in monomer, either methyl methacrylate or ethyl acrylate (generally methyl methacrylate) (5 g) under nitrogen, was added (C.4) ($10^{-3}$ mmole). After an induction period of less than 70 sec, the exothermic polymerisation reaction took place. The maximum reaction temperature was observed at time after induction tmax some 250 sec later. The resulting poly(methyl methacrylate) typically had $M_n = 130K$ and a MWD $(M_w/M_n) = 2.1$.

The following tabulated reaction components were used analogously, with the following results.

| initiator | co-catalyst ml × $10^{-3}$ | yield % | $M_n$ K | MWD | $t_{max}$ min |
|---|---|---|---|---|---|
| with methyl methacrylate: | | | | | |
| (E.1) | 10 | 76 | 130.5 | 2.1 | 4 |
| (E.2) | 10 | 69 | 69.5 | 2.2 | |
| (E.3) | 50 | 72 | 78 | 3.6 | 37 |
| (E.4) | 50 | 87 | 131 | 2.1 | 1.5 |
| (E.15) | 10 | | 153 | 2.1 | 4.5 |
| (E.16) | 100 | | 264 | 2.6 | 17 |

| | co-catalyst | yield | | |
| initiator | ml × $10^{-3}$ | % | Mn | MWD |
|---|---|---|---|---|
| with ethyl acrylate: | | | | |
| (E.3) | 50 | 69 | 86.5 | 2.1 |

Initiators (E.5) to (E.14) with co-catalysts (C.1) to (C.4) may be used analogously with similar results.

Optionally complexed fluoride is a preferred anion in component b). However, azide, cyanide, cyanate, fluoride, bifluoride, and other aliphatic and aromatic monosulphonates are used analogously with similar results. Any cation which in use of the catalyst is inert may be used in place of the tetrabutyl ammonium TBA cation, provided that it renders the co-catalyst as soluble in the reaction mixture as the TBA salt.

We claim:

1. A catalyst for addition polymerization comprising:
   (a) an (initiator) first component of Formula (I):

$$MX(Y_n)Z_p \qquad (I)$$

wherein

M is Si, Ge or Sn;

n is O or an integer, and p is an integer such that $(n+p) = 3$;

X is a radical

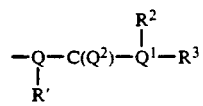

where

Q and $Q^1$ are each independently N, P or As;

$Q^2$ is O, S, NR or PR where R is $C_{1-4}$ alkyl;

$R^1$ is H, alkyl, branched alkyl, cycloalkyl, polycycloalkyl, aryl or aralkyl, all of which can also be substituted by pendent mono- or di-valent groups or by hetero atoms or both; and $R^2$ and $R^3$ are each independently alkyl, branched alkyl, cycloalkyl, polycycloalkyl, aryl or aralkyl groups, or $R^2$ and $R^3$ together are alkanediyl, cycloalkanediyl, polycycloalkanediyl or diradical combinations of such diradicals, all of which can also be substituted by pendent mono- or di-valent groups or by hetero atoms or groups or both;

all such $R^1$, $R^2$ and $R^3$ being inert in the conditions of the polymerization process of the present invention;

Y is A or OA where A is alkyl, branched alkyl, cycloalkyl, polycycloalkyl, aryl or aralky, all of which can also be substituted by pendent mono- or di-valent groups and are inert in the conditions of the polymerization process of the present invention, or trialkylsilylalkyl; and Z is independently any group as defined for Y, or an organic polymer radical comprising further $MXY_n$ moieties, or p is 2 and $Z_{[2]p}$ is $-OSiR^5R^6OSiR^7R^8O-$ where $R^5$, $R^6$, $R^7$ and $R^8$ are each independently selected from any of the values defined for $R^1$ or $R^2$, or a moiety —ELE— where E is a bond or O and L is a polymer diradical, or E is O and L is an inorganic solid on whose surface the two —O— groups are located, which comprises further —OMX(Y)O— moieties; and (b) a (co-catalyst) second component salt comprising an anion selected from azide, cyanide, cyanate, fluoride, bifluoride, nitrate and aliphatic or aromatic mono and poly-phosphonates, -phosphinates, sulphonates, -sulphinates, -carboxylates, siloxides, and -oxides, all such aliphatic or aromatic groups can also be substituted by electron withdrawing groups; and a cation which in use of the catalyst is inert under the polymerisation process conditions yet renders the co-catalyst available in the polymerising medium.

2. A catalyst according to claim 1 wherein M is Si, each of Q and $Q^1$ is N, $Q^2$ is O and $R^1$, $R^2$, and $R^3$ are each independently alkyl, cycloaklyl or polycycloalkyl, which alkyl, cycloalky, or polycycloalkyl can also be substituted by pendent mono- or di-valent groups or by hetero atoms or both.

3. A catalyst according to claim 2 wherein $R^1$, $R^2$, and $R^3$ are each $C_{1-6}$ alkyl, unsubstituted by hetero atoms, or $R^1$ is $C_{1-6}$ alkoxy or $R^2$ is an $M(Y_n)Z$ group.

4. A catalyst according to claim 2 wherein each of $R^1$, $R^2$ and $R^3$ independently is methyl, ethyl, n-propyl, n-butyl, n-pentyl or n-hexyl.

5. A catalyst according to claim 1 wherein the catalyst first (initiator) component is of formula (II)

$$MX(Y_q)Z^3{}_r \qquad (II)$$

wherein
M is Si, Ge or Sn;
q and r are each an integer such that (q+r)=3;
X and Y are as defined hereinbefore; and
$Z^3$ is a monovalent Z group as defined in claim 1.

6. A catalyst according to claim 5 wherein the or each Z substituent is a monovalent polymer radical.

7. A catalyst according to claim 1, wherein the anion of the co-catalyst component b) comprises fluoride or bifluoride.

8. A compound of Formula (I):

$$MX(Y_n)Z_p \qquad (I)$$

wherein
M is Si, Ge or Sn;
n is O or an integer, and p is an integer such that (n+p)=3;
X is a radical

where
Q and $Q^1$ are each independently N, P or As;
$Q^2$ is O, S, NR or PR where R is $C_{1-4}$ alkyl;
$R^1$ is alkyl, branched alkyl, cycloalkyl, polycycloalkyl, aryl or aralkyl, all of which are either unsubstituted or substituted by pendent mono- or di-valent groups and/or by hetero atoms; or H; and
$R^2$ and $R^3$ are each independently alkyl, branched alkyl, cycloalkyl, polycycloalkyl, aryl or aralkyl groups, or $R^2$ and $R^3$ together are alkanediyl, cycloalkanediyl polycycloalkanediyl or diradical combinations of such diradicals, all of which are either unsubstituted or substituted by pendent mono- or di-valent groups and/or by hetero atoms or groups;
all such $R^1$, $R^2$ and $R^3$ being inert in the conditions of the polymerization process of the present invention;
Y is A or OA where A is alkyl, branched alkyl, cycloalkyl, polycycloalkyl, aryl or aralkyl, all of which are either unsubstituted or substituted by pendent mono- or di-valent groups and are inert the conditions of the polymerisation process of the present invention, or trialkylsilylalkyl; and
Z is independently any group as defined for Y, or an organic polymer radical comprising further $MXY_n$ moieties; or
p is 2 and
$Z_p$ is $—OSiR^5R^6OSiR^7R^8O—$ where $R^5$, $R^6$, $R^7$ and $R^8$ are each independently selected from any of the values defined for $R^1$ or $R^2$, or $Z_p$ which is a moiety $—ELE—$ where E is a bond or O and L is a polymer diradical, or E is O and L is an inorganic solid on whose surface the two $—O—$ groups are located, which comprises further $—OMX(Y)O—$ moieties.

* * * * *